US012641409B2

(12) United States Patent　　　　(10) Patent No.:　US 12,641,409 B2
Yan et al.　　　　　　　　　　　　　(45) Date of Patent:　　May 26, 2026

(54) SYSTEMS AND METHODS FOR ENHANCED ACCESS AND MOBILITY DATA CONTROL

(71) Applicant: Verizon Patent and Licensing Inc., Basking Ridge, NJ (US)

(72) Inventors: Lixia Yan, Basking Ridge, NJ (US); Violeta Cakulev, Milburn, NJ (US); Shanthala Kuravangi-Thammaiah, Keller, TX (US); Sudhakar Reddy Patil, Flower Mound, TX (US)

(73) Assignee: Verizon P atent and Licensing Inc., Basking Ridge, NJ (US)

( * ) Notice: Subject to any disclaimer, the term of this patent is extended or adjusted under 35 U.S.C. 154(b) by 321 days.

(21) Appl. No.: 18/337,872

(22) Filed: Jun. 20, 2023

(65) Prior Publication Data

US 2024/0430661 A1　　Dec. 26, 2024

(51) Int. Cl.
*H04W 8/08*　　　　(2009.01)
(52) U.S. Cl.
CPC ..................................... *H04W 8/08* (2013.01)
(58) Field of Classification Search
CPC ........... H04W 4/20; H04W 8/00; H04W 8/02; H04W 8/04; H04W 8/06; H04W 8/08; H04W 8/082; H04W 8/085; H04W 8/087;

H04W 8/10; H04W 8/12; H04W 8/14; H04W 8/18; H04W 8/20; H04W 8/22; H04W 8/24; H04W 28/10; H04W 28/12; H04W 36/0005; H04W 60/00; H04W 60/005; H04W 60/02; H04W 60/04
See application file for complete search history.

(56)　　　　　References Cited

U.S. PATENT DOCUMENTS

| | | | |
|---|---|---|---|
| 2020/0267522 A1* | 8/2020 | Lee | H04W 4/029 |
| 2021/0136674 A1* | 5/2021 | Lee | H04W 80/10 |
| 2024/0147191 A1* | 5/2024 | Ling | H04W 4/06 |

* cited by examiner

*Primary Examiner* — Matthew W Genack

(57)　　　　　　ABSTRACT

In some implementations, a policy control function (PCF) device may receive, from an access and mobility management function (AMF) device, an access and mobility (AM) policy association request that is related to a user equipment (UE) that is associated with AM policy data. The PCF device may modify at least a portion of the AM policy data to generate modified AM policy data associated with the UE. The PCF device may create, based on the modified AM policy data, an AM control policy associated with the UE. The PCF device may transmit, to the AMF device, an AM policy association message, responsive to the AM policy association request, indicating the AM control policy.

20 Claims, 7 Drawing Sheets

100B

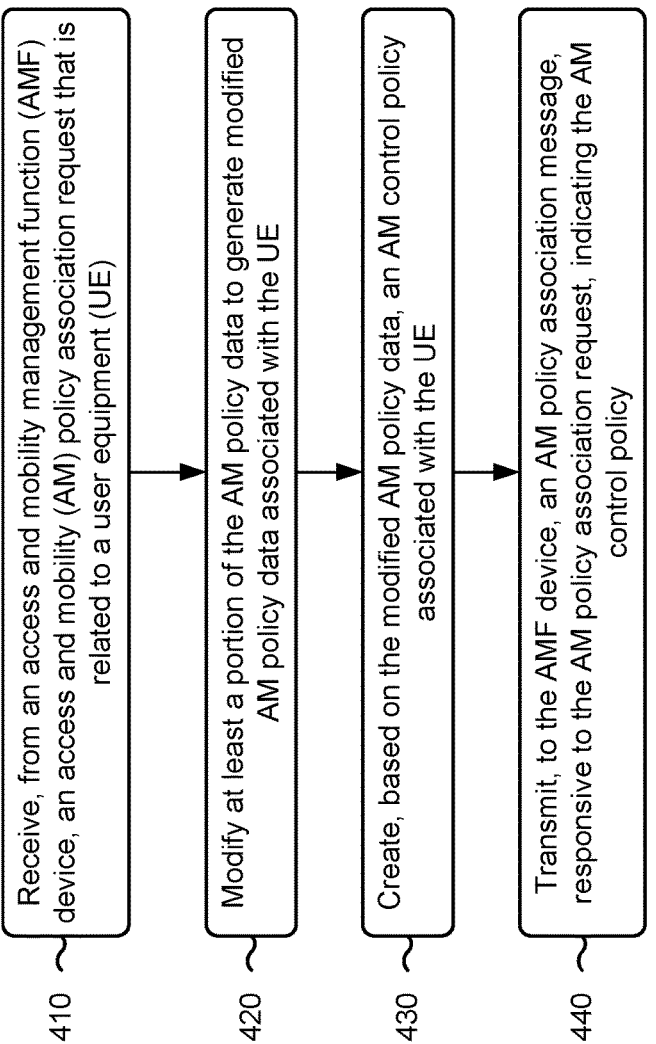

410 — Receive, from an access and mobility management function (AMF) device, an access and mobility (AM) policy association request that is related to a user equipment (UE)

420 — Modify at least a portion of the AM policy data to generate modified AM policy data associated with the UE 430 — Create, based on the modified AM policy data, an AM control policy associated with the UE 440 — Transmit, to the AMF device, an AM policy association message, responsive to the AM policy association request, indicating the AM control policy

510 — Transmit, to a policy control function (PCF) device, an access and mobility (AM) policy association request that is related to a user equipment (UE)

520 — Receive, from the PCF device, an AM policy association response to the AM policy association request, indicating an AM control policy that includes modified AM policy data associated with the UE

500

1

SYSTEMS AND METHODS FOR ENHANCED ACCESS AND MOBILITY DATA CONTROL

BACKGROUND

In a wireless network, a policy control function (PCF) device controls and maintains policies associated with a user equipment (UE). For example, the PCF device may control and/or maintain policies associated with access, mobility, and/or quality of service (QOS) associated with the UE.

BRIEF DESCRIPTION OF THE DRAWINGS

FIGS. 4-5 are flowcharts of example processes associated with enhanced AM data control.

DETAILED DESCRIPTION OF EXAMPLE EMBODIMENTS

Figure 1A:
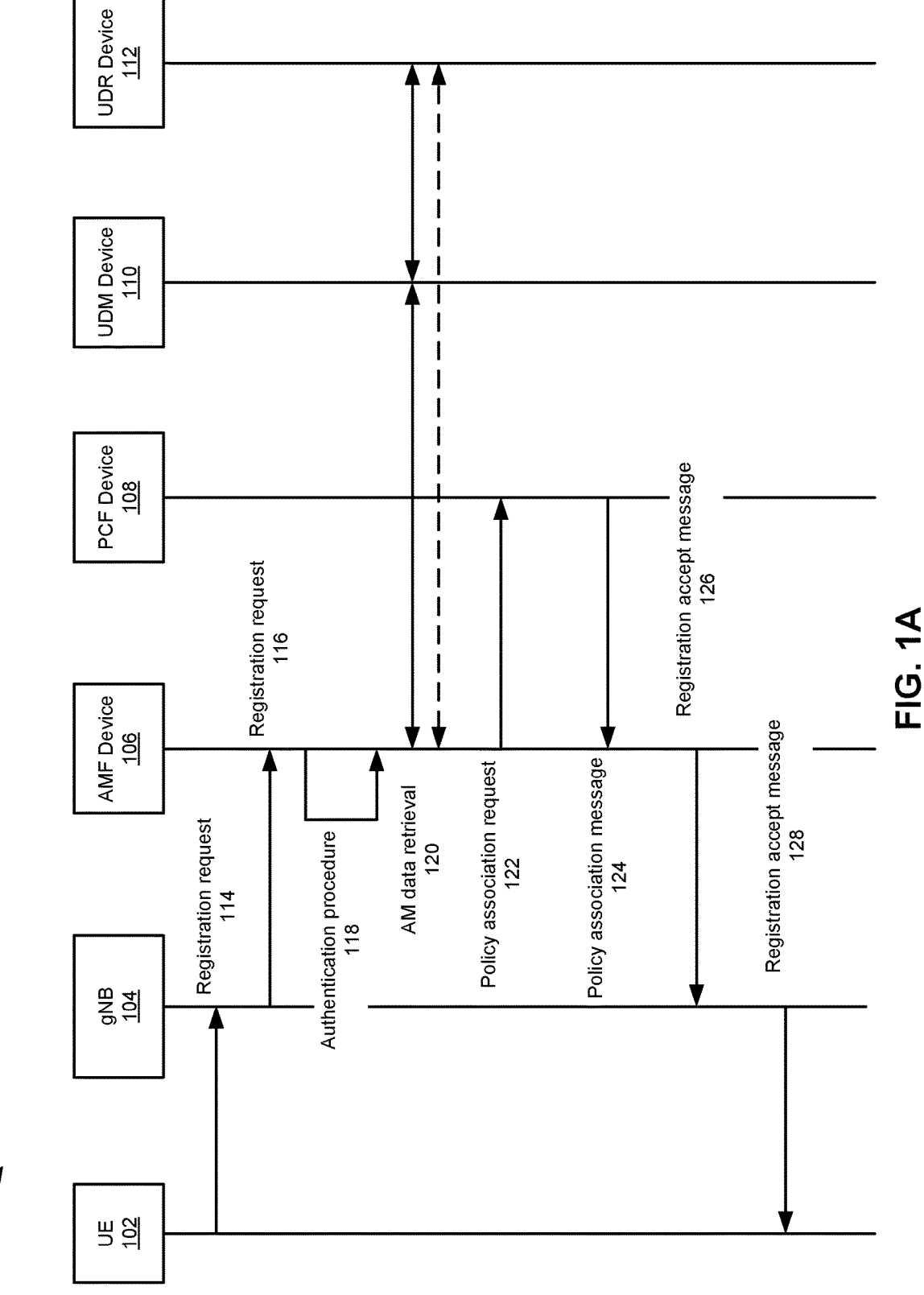
FIGS. 1A-1B are diagrams of examples associated with enhanced access and mobility (AM) data control.

The following detailed description of example implementations refers to the accompanying drawings. The same reference numbers in different drawings may identify the same or similar elements.

A policy control function (PCF) device is a core network device (or network function) that may interact with other network devices, such as an access and mobility management function (AMF) device, a unified data management (UDM) device, and/or a unified data repository (UDR) device, to manage policies associated with a user equipment (UE). For example, in a policy association procedure, the AMF device may transmit, and the PCF device may receive, a policy association request (e.g., an access and mobility (AM) policy association request) related to a UE. The PCF device may retrieve, based on the policy association request, AM policy data associated with the UE from the UDR device. The AM policy data associated with the UE is provisioned into the UDR device (e.g., by a mobile network operator (MNO) that may use a network device to manually provision the UDM device and/or the UDR device with the AM policy data).

The PCF device may generate AM control policy decisions based on the AM policy data associated with the UE. As an example, if the AM policy data indicates that the UE is associated with a default or baseline data plan, then the AM control policy (e.g., created by the PCF device) may enable the UE to access a network slice associated with a default or baseline data speed. The PCF device may transmit, and the AMF device may receive, the AM control policy. The AMF device may enforce the AM control policy.

In some cases, the AM control policy associated with the UE may need to be adjusted. As an example, if the AM policy data associated with the UE is replaced with updated AM policy data that indicates an upgraded data plan (e.g., via the MNO using the network device to manually provision the UDR device with the updated AM policy data), then the UDM device and/or the UDR device may transmit, and the PCF device may receive, an indication of the updated AM policy data. The PCF device may adjust the AM control policy to generate an adjusted AM control policy associated with the UE based on the updated AM policy data to enable the UE to access a network slice associated with an upgraded data speed. The PCF device may transmit, and the AMF device may receive, the adjusted AM control policy. The AMF device may enforce the adjusted AM control policy.

Accordingly, because updates to AM policy data associated with UEs are manually provisioned, updating AM policy data associated with a large number of UEs presents several challenges and potential issues. For example, manually provisioning the UDM device and/or the UDR device with updated data for each of the UEs can be laborious, time-consuming, and prone to errors. Furthermore, in some cases, the updated AM policy data may be associated with an expiry period (e.g., the updated AM policy data is only valid for a time period indicated by the expiry period), which results in the AM policy data being manually provisioned multiple times (e.g., based on an expiration of the expiry period).

Some implementations described herein provide enhanced AM policy data control. For example, an AMF device may transmit, and a PCF device may receive, an AM policy association request (e.g., associated with a registration procedure and/or a handover procedure) that is related to a UE. The UE may be associated with AM policy data that is stored by a UDR device. The PCF device may modify at least a portion of the AM policy data to generate modified AM policy data associated with the UE. The PCF device may create, based on the modified AM policy data, an AM control policy associated with the UE. The PCF device may transmit, and the AMF device may receive, an AM policy association response indicating the AM control policy.

In some implementations, the PCF device may receive an indication of changed AM policy data associated with the UE. For example, a network device associated with the UE may transmit, and the PCF device may receive, the indication of the changed AM policy data associated with the UE. The PCF device may create the AM control policy associated with the UE based on the changed AM policy data. As an example, the PCF device may use a script to automatically create the AM control policy. In some implementations, the AM control policy may be associated with an expiry period. As an example, the changed AM policy data may be valid for a time period indicated by the expiry period. In this way, some implementations described herein enable an updated AM control policy to be automatically generated based on an expiration of the expiry period, which removes a need to manually provisioning the AM policy data, as described in more detail elsewhere herein.

FIG. 1A is a diagram of an example 100A associated with enhanced AM data control. As shown in FIGS. 1A, example 100A includes a UE 102, a next generation node B (gNB) 104, an AMF device 106, a PCF device 108, a UDM device 110, and UDR device 112.

As shown in FIG. 1A, and by reference number 114, the UE 102 may transmit, and the gNB 104 may receive, a registration request. For example, the UE 102 may transmit, and the gNB 104 may receive, the registration request to register with a wireless network that the UE 102 accesses via the gNB 104. In some implementations, the registration request may indicate an identifier of the UE, a registration type (e.g., an initial registration, a mobility registration update, a periodic registration update, and/or an emergency registration, among other examples), non-access stratum (NAS) security parameters (e.g., that may be used to secure NAS messages), requested network slice selection assistance information (NSSAI), UE security capability information, and/or UE network capability, among other examples.

In some implementations, the registration request may be included in a radio resource control (RRC) setup complete message.

As further shown in FIG. 1A, and by reference number 116, the gNB 104 may transmit, and the AMF device 106 may receive, the registration request. In some implementations, the gNB 104 may forward the registration request to the AMF device 106 for processing, as described in more detail elsewhere herein.

As further shown in FIG. 1A, and by reference number 118, the AMF device 106 may perform an authentication procedure. For example, the AMF device 106 may interact with another network device (e.g., an authentication server function (AUSF) device (not explicitly shown in FIG. 1A) to authenticate the UE 102 (e.g., based on the information indicated by the registration request).

As further shown in FIG. 1A, and by reference number 120, the AMF device 106 may perform an AM data retrieval procedure. As an example, the AMF device 106 may transmit, and the UDM device 110 may receive, an AM data request (e.g., after authenticating the UE 102). In some implementations, the UDM device 110 may retrieve the AM data associated with the UE 102 (e.g., from the UDR device 112) based on the AM data request. In some implementations, the AM data associated with the UE 102 may include subscriber identity information, UE location information, access point information, network access state information, authentication information, bearer context information, mobility management context information, security parameter information, and/or access restriction information, among other examples. The UDM device 110 may transmit, and the AMF device 106 may receive, an indication of the AM data associated with the UE 102 (e.g., retrieved by the UDM device 110).

As another example, the AMF device 106 may transmit, and the UDR device 112 may receive, an AM data request. For example, the AMF device 106 may transmit, and the UDR device 112 may receive, the AM data request (e.g., after authenticating the UE 102). The UDR device 112 may transmit, and the AMF device 106 may receive, an indication of the AM data associated with the UE 102 (e.g., retrieved by the UDR device 110). In some implementations, the AMF device 106 may transmit, and the UDR device 112 may receive, the AM data request (e.g., after authenticating the UE 102) rather than retrieving the AM data from the UDM device 110 and the UDR device 112 (e.g., shown as a dashed double arrow in FIG. 1A). Additionally, or alternatively, the AMF device 106 may transmit, and the UDM device 110 may receive, the AM data request (e.g., after authenticating the UE 102) rather than retrieving the AM data from the UDM device 110 and the UDR device 112.

As further shown in FIG. 1A, and by reference number 122, the AMF device 106 may transmit, and the PCF device 108 may receive, a policy association request (e.g., an AM policy association request). For example, the AMF device 106 may transmit, and the PCF device 108 may receive, the policy association request based on the registration request. The policy association request may indicate the AM data associated with the UE 102 and/or context information associated with the UE 102 (e.g., access type, user location, radio access technology (RAT) type, and/or UE usage type, among other examples).

In some implementations, the PCF device 108 may determine one or more policies to be applied to the UE 102 (e.g., by the AMF device 106) based on the information indicated by the policy association request (e.g., the AM data associated with the UE 102 and/or the context information, among other examples). In some implementations, the PCF device 108 may modify the AM data associated with the UE 102. As an example, a network device (e.g., a network device associated with an MNO) may transmit, and the PCF device 108 may receive, an indication of changed AM policy data associated with the UE 102.

For example, if the AM policy data indicates that the UE is associated with a default or baseline data plan, then the indication of changed AM policy data associated with the UE 102 may indicate that the UE 102 is associated with an upgraded plan. The PCF device 108 may modify the AM policy data associated with the UE 102 to generate modified AM policy data associated with the UE 102 (e.g., by indicating that the UE 102 is associated with the upgraded plan rather than the default or baseline plan). In some implementations, the PCF device 108 may generate the modified AM control policy by using a script that automatically overwrites the AM policy data with the changed AM policy data. For example, as described herein, the PCF device 108 may read or retrieve the AM policy data from the UDR device 112, may derive the AM control policy based on the AM policy data read or retrieved from the UDR device 112, and may send the AM control policy to the AMF device 106. In this way, the PCF device 108 may determine the one or more policies to be applied to the UE 102 based on the modified AM policy data. As an example, the PCF device 108 may create, based on the modified AM policy data, an AM control policy associated with the UE 102 (e.g., that is enforced by the AMF device 106). Furthermore, the AMF device 106 may read or retrieve AM data from the UDM device 110, but the PCF device 108 can overwrite the AM data that the AMF device 106 reads or retrieves from the UDM device 110 by sending the AM control policy to the AMF device 106.

In some implementations, the AM control policy derived from the modified AM policy data may include one or more subscribed NSSAIs, one or more allowed NSSAIs, one or more configured NSSAIs, one or more mobility restrictions, one or more RAT restrictions, one or more core network type restrictions, one or more forbidden areas, one or more UE usage types, an interworking support indication (e.g., an N26 interworking support indication), and/or an NSSAI inclusion mode indication, among other examples.

The PCF device 108 may generate a policy association message indicating the AM control policy. In some implementations, the AM control policy may be associated with an expiry period. As an example, the changed AM policy data may be valid for a time period indicated by the expiry period. In this way, the PCF device 108 may automatically generate an updated AM control policy, which includes replacing the changed AM policy data with the original AM policy data (e.g., the AM policy data that was overwritten via the script), based on an expiration of the expiry period.

As further shown in FIG. 1A, and by reference number 124, the PCF device 108 may transmit, and the AMF device 106 may receive, the policy association message. For example, the PCF device 108 may transmit, and the AMF device 106 may receive, the policy association message in response to creating the AM control policy. The AMF device 106 may enforce the AM control policy on the UE 102 (e.g., by applying the one or more policies associated with the UE 102).

As further shown in FIG. 1A, and by reference number 126, the AMF device 106 may transmit, and the gNB 104 may receive, a registration accept message. For example, the AMF device 106 may transmit, and the gNB 104 may receive, the registration accept message in response to receiving the policy association message and/or in response to the registration request.

As further shown in FIG. 1A, and by reference number 128, the gNB 104 may transmit, and the UE 102 may receive, the registration accept message. For example, the gNB 104 may forward the registration accept message to the UE 102 based on receiving the registration accept message from the AMF device 106 and/or in response to the registration request.

Figure 1B:
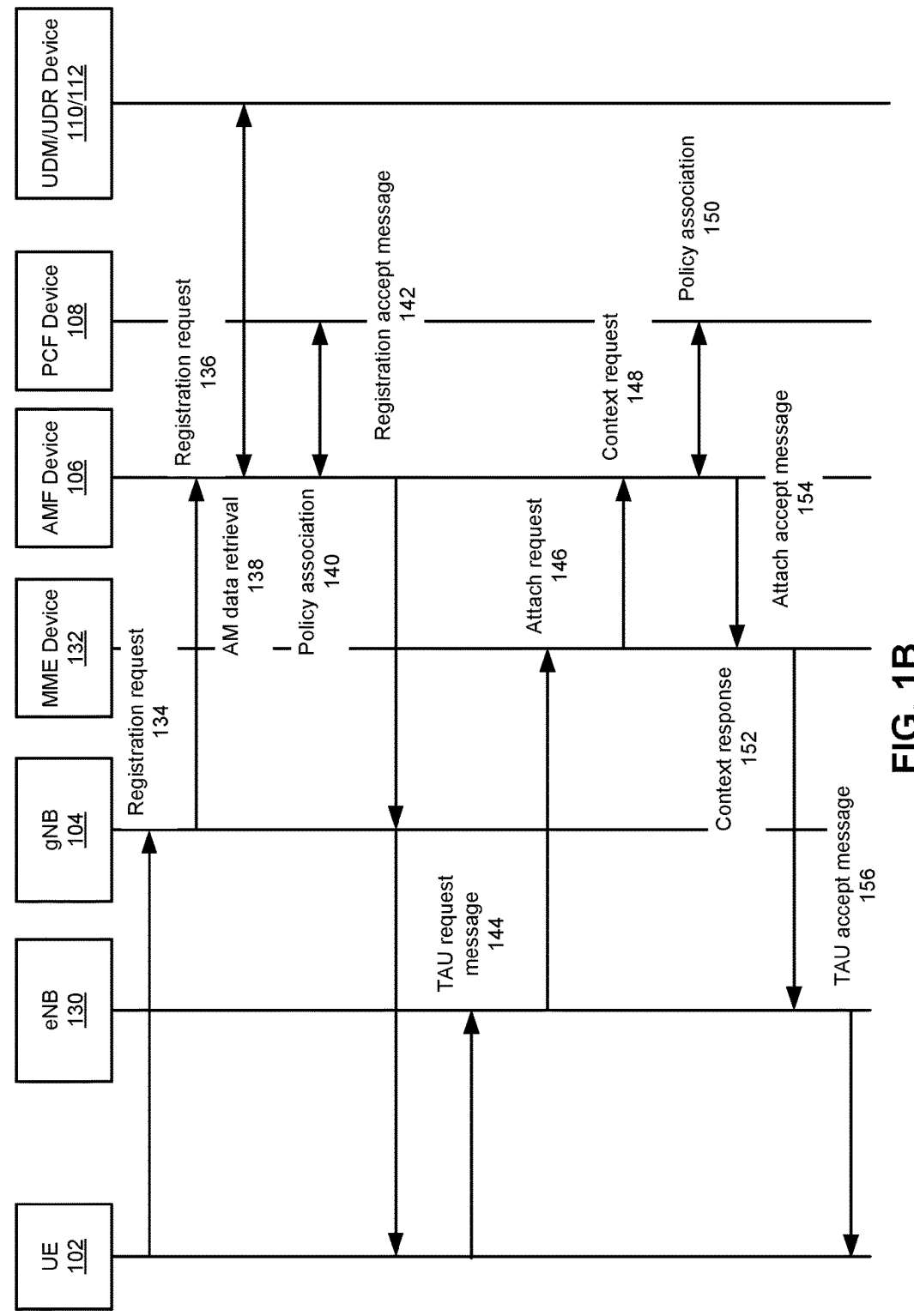

FIG. 1B is a diagram of an example 100B associated with enhanced AM data control. As shown in FIGS. 1B, example 100A includes a UE 102, a gNB 104, an AMF device 106, a PCF device 108, a UDM device 110, a UDR device 112, an evolved Node B (eNB) 130, and a mobility management entity (MME) device 132. Furthermore, example 100B is related to an inter-RAT handover (e.g., 5G to 4G). Although example 100B is related to an inter-RAT handover, some techniques described herein may be used in suitable manner.

As shown in FIG. 1B, and by reference number 134, the UE 102 may transmit, and the gNB 104 may receive, a registration request. For example, the UE 102 may transmit, and the gNB 104 may receive, the registration request in a same or similar manner as described in connection with FIG. 1A and reference number 114 and/or as described in more detail elsewhere herein.

As further shown in FIG. 1B, and by reference number 136, the gNB 104 may transmit, and the AMF device 106 may receive, the registration request. In some implementations, the gNB 104 may forward the registration request to the AMF device 106 for processing, as described in more detail elsewhere herein.

As further shown in FIG. 1B, and by reference number 138, the AMF device 106 may perform an AM data retrieval procedure. As an example, the AMF device 106 may perform the AM data retrieval procedure in a same or similar manner as described in connection with FIG. 1A and reference number 138 and/or as described in more detail elsewhere herein.

As further shown in FIG. 1B, and by reference number 140, the AMF device 106 and the PCF device 108 may perform a policy association procedure. As an example, the AMF device 106 and the PCF device 108 may perform a policy association procedure in a same or similar manner as described in connection with FIG. 1A and reference numbers 122 and 124 and/or as described in more detail elsewhere herein.

As further shown in FIG. 1B, and by reference number 142, the AMF device 106 may transmit a registration accept message to the gNB 104, and the gNB 104 may forward the registration accept message to the UE 102.

As further shown in FIG. 1B, and by reference number 144, the UE 102 may transmit, and the eNB 130 may receive, a tracking area update (TAU) request message. For example, the UE 102 may transmit, and the eNB 130 may receive, the TAU request message based on the UE 102 detecting that the UE 102 has moved from a first tracking area (TA) to a second TA. In some implementations, the TAU request message may indicate an identifier of the UE 102 and/or a last visited registered tracking area identity (TAI), among other examples.

As further shown in FIG. 1B, and by reference number 146, the eNB 130 may transmit, and the MME device 132 may receive, an attach request. For example, the eNB 130 may implement a signaling connection, and the UE 102 may send the attach request to the MME device 132 via the eNB 130. In some implementations, the attach request may indicate an identifier of the UE 102, UE network capability, and/or an indication of a last visited registered TAI, among other examples.

As further shown in FIG. 1B, and by reference number 148, the MME device 132 may transmit, and the AMF device 106 may receive, a context request (e.g., to obtain a subscription profile of the UE 102, among other examples). In some implementations, the AMF device 106 and the PCF device 108 may perform a policy association procedure, as described in more detail elsewhere herein.

As further shown in FIG. 1B, and by reference number 150, the AMF device 106 and the PCF device 108 may perform a policy association procedure. As an example, the AMF device 106 and the PCF device 108 may perform a policy association procedure in a same or similar manner as described in connection with FIG. 1A and reference numbers 122 and 124 and/or as described in more detail elsewhere herein.

As further shown in FIG. 1B, and by reference number 152, the AMF device 106 may transmit, and the MME device 132 may receive, a context response. In some implementations, the MME device 132 may create a new context for the UE 102 (e.g., based on the context response).

As further shown in FIG. 1B, and by reference number 154, the MME device 132 may transmit, and the eNB 130 may receive, an attach accept message. In some implementations, the MME device 132 may transmit, and the eNB 130 may receive, the attach accept message based on the UE 102 being allowed to connect to the network.

As further shown in FIG. 1B, and by reference number 156, the eNB 130 may transmit, and the UE 102 may receive, a TAU accept message. In some implementations, the eNB 130 may transmit, and the UE 102 may receive, the TAU accept message in response to the eNB 130 receiving the accept message from the MME device 132. In some implementations, the TAU accept message may indicate that the TA associated with the UE 102 is updated.

In this way, some implementations described herein provide enhanced AM policy data control. For example, the AMF device 106 may transmit, and the PCF device 108 may receive, the AM policy association request (e.g., associated with a registration procedure and/or a handover procedure) that is related to the UE 102. The UE 102 may be associated with AM policy data that is stored by the UDM device 110 and/or the UDR device 112. The PCF device 108 may modify at least a portion of the AM policy data to generate modified AM policy data associated with the UE 102. The PCF device 108 may create, based on the modified AM policy data, an AM control policy associated with the UE 102. The PCF device 108 may transmit, and the AMF device 106 may receive, an AM policy association response indicating the AM control policy.

Furthermore, the PCF device 108 may receive an indication of changed AM policy data associated with the UE 102. For example, a network device associated with the UE 102 may transmit, and the PCF device 108 may receive, the indication of the changed AM policy data associated with the UE 102. The PCF device 108 may create the AM control policy associated with the UE 102 based on the changed AM policy data (e.g., the PCF device 108 may use a script to automatically create the AM control policy). In some implementations, the AM control policy may be associated with an expiry period. As an example, the changed AM policy data may be valid for a time period indicated by the expiry period. In this way, some implementations described herein enable an updated AM control policy to be automatically generated based on an expiration of the expiry period, which removes a need to manually provisioning the AM policy data, as described in more detail elsewhere herein.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2A:
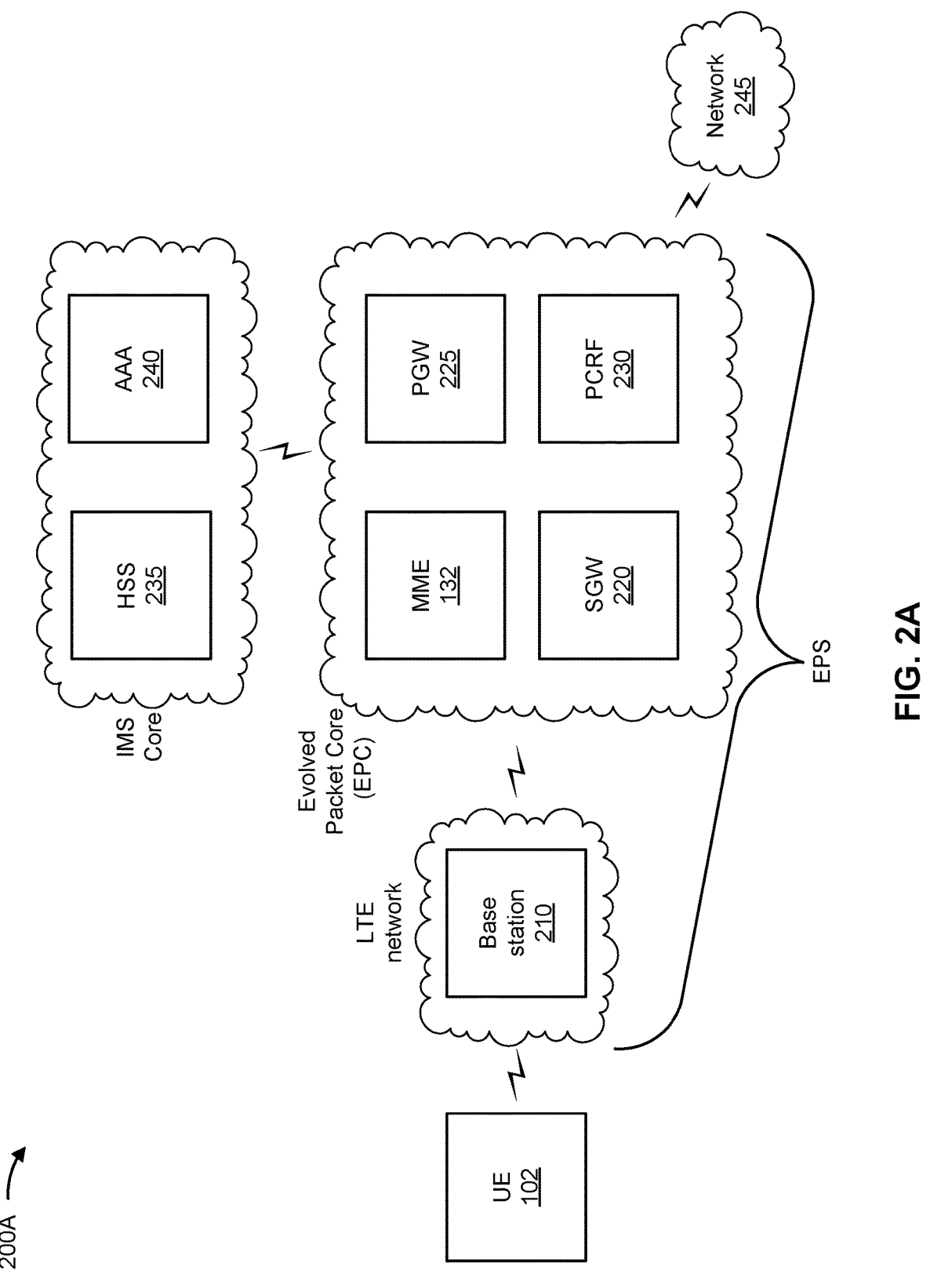
FIGS. 2A-2B are diagram of example environments in which systems and/or methods described herein may be implemented.

FIG. 2A is a diagram of an example environment 200A in which systems and/or methods described herein may be implemented. As shown in FIG. 2A, environment 200A may include a UE 102, a base station 210 (e.g., the eNB 130), the MME 132, a serving gateway (SGW) 220, a packet data network gateway (PGW) 225, a policy and charging rules function (PCRF) 230, a home subscriber server (HSS) 235, an authentication, authorization, and accounting server (AAA) 240, and a network 245. Devices of environment 200A may interconnect via wired connections, wireless connections, or a combination of wired and wireless connections.

Some implementations are described herein as being performed within a long-term evolution (LTE) network for explanatory purposes. Some implementations may be performed within a network that is not an LTE network, such as a third generation (3G) network or a fifth generation (5G) network.

Environment 200A may include an evolved packet system (EPS) that includes an LTE network and/or an evolved packet core (EPC) that operate based on a third-generation partnership project (3GPP) wireless communication standard. The LTE network may include a radio access network (RAN) that includes one or more base stations 210 that take the form of evolved Node Bs (eNBs) 130 via which UE 102 communicates with the EPC. The EPC may include MME 132, SGW 220, and/or PGW 225 to enable UE 102 to communicate with network 245 and/or an Internet protocol (IP) multimedia subsystem (IMS) core. The IMS core may include HSS 235 and/or AAA 240, and may manage device registration and authentication, session initiation, and/or other operations associated with user devices 205. HSS 235 and/or AAA 240 may reside in the EPC and/or the IMS core.

UE 102 includes one or more devices capable of communicating with other user devices 205, base station 210, and/or a network (e.g., network 245). For example, UE 102 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. UE 102 may send traffic to and/or receive traffic from another UE 102 and/or network 245 (e.g., via base station 210, SGW 220, and/or PGW 225).

Base station 210 includes one or more devices capable of transferring traffic, such as audio, video, text, and/or other traffic, destined for and/or received from UE 102. In some implementations, base station 210 may include an eNB (e.g., the eNB 130) associated with the LTE network that receives traffic from and/or sends traffic to network 245 via SGW 220 and/or PGW 225. Additionally, or alternatively, one or more base stations 210 may be associated with a RAN that is not associated with the LTE network. Base station 210 may send traffic to and/or receive traffic from UE 102 via an air interface. In some implementations, base station 210 may include a small cell base station, such as a base station of a microcell, a picocell, or a femtocell.

MME 132 includes one or more devices, such as one or more server devices, capable of managing authentication, activation, deactivation, and/or mobility functions associated with UE 102. In some implementations, MME 132 may perform operations relating to authentication of UE 102. Additionally, or alternatively, MME 132 may facilitate the selection of a particular SGW 220 and/or a particular PGW 225 to provide traffic to and/or from UE 102. MME 132 may perform operations associated with handing off UE 102 from a first base station 210 to a second base station 210 when UE 102 is transitioning from a first cell associated with the first base station 210 to a second cell associated with the second base station 210. Additionally, or alternatively, MME 132 may select another MME (not shown in FIG. 2A), to which UE 102 should be handed off (e.g., when UE 102 moves out of range of MME 132).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 245 (e.g., via PGW 225) and/or other network devices associated with the EPC and/or the IMS core. SGW 220 may receive traffic from network 245 and/or other network devices, and may send the received traffic to UE 102 via base station 210. Additionally, or alternatively, SGW 220 may perform operations associated with handing off UE 102 to and/or from an LTE network.

PGW 225 includes one or more devices capable of providing connectivity for UE 102 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 245. Additionally, or alternatively, PGW 225 may receive traffic from network 245, and may send the traffic to UE 102 via SGW 220 and base station 210. PGW 225 may record data usage information (e.g., byte usage), and may provide the data usage information to AAA 240.

PCRF 230 includes one or more devices, such as one or more server devices, capable of providing policy control decision and flow-based charging control functionalities. For example, PCRF 230 may provide network control regarding service data flow detection, gating, and/or quality of service (QOS) and flow-based charging, among other examples. In some implementations, PCRF 230 may determine how a certain service data flow is to be treated, and may ensure that user plane traffic mapping and treatment is in accordance with a user subscription profile.

HSS 235 includes one or more devices, such as one or more server devices, capable of managing (e.g., receiving, generating, storing, processing, and/or providing) information associated with UE 102. For example, HSS 235 may manage subscription information associated with UE 102, such as information that identifies a subscriber profile of a user associated with UE 102, information that identifies services and/or applications that are accessible to UE 102, location information associated with UE 102, a network identifier (e.g., a network address) that identifies UE 102, information that identifies a treatment of UE 102 (e.g., quality of service information, a quantity of minutes allowed per time period, and/or a quantity of data consumption allowed per time period), and/or similar information. HSS 235 may provide this information to one or more other devices of environment 200A to support the operations performed by those devices.

AAA 240 includes one or more devices, such as one or more server devices, that perform authentication, authorization, and/or accounting operations for communication sessions associated with UE 102. For example, AAA 240 may perform authentication operations for UE 102 and/or a user of UE 102 (e.g., using one or more credentials), may control access, by UE 102, to a service and/or an application (e.g., based on one or more restrictions, such as time-of-day restrictions, location restrictions, single or multiple access restrictions, read/write restrictions, etc.), may track resources consumed by UE 102 (e.g., a quantity of voice minutes consumed and/or a quantity of data consumed, among other examples), and/or may perform similar operations.

Network 245 includes one or more wired and/or wireless networks. For example, network 245 may include a cellular network (e.g., a 5G network, an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 2A are provided as an example. In practice, there may be additional devices and/or networks, fewer devices and/or networks, different devices and/or networks, or differently arranged devices and/or networks than those shown in FIG. 2A. Furthermore, two or more devices shown in FIG. 2A may be implemented within a single device, or a single device shown in FIG. 2A may be implemented as multiple, distributed devices. Additionally, or alternatively, a set of devices (e.g., one or more devices) of environment 200A may perform one or more functions described as being performed by another set of devices of environment 200A.

Figure 2B:
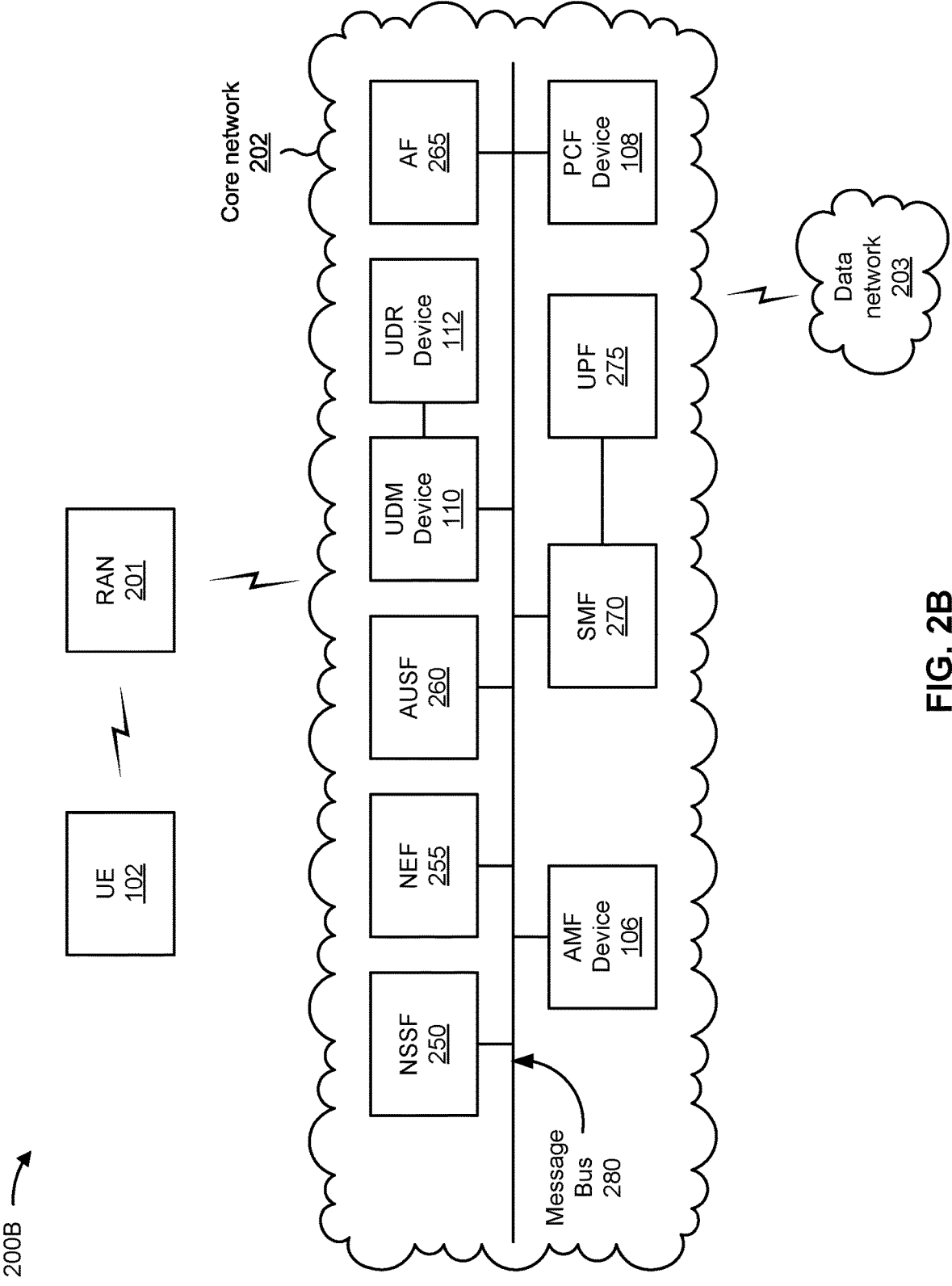

FIG. 2B is a diagram of an example environment 200B in which systems and/or methods described herein may be implemented. As shown in FIG. 2B, example environment 200B may include a UE 102, a RAN 201, a core network 202, and a data network 203. Devices and/or networks of example environment 200B may interconnect via wired connections, wireless connections, or a combination of wired and wireless connections.

UE 102 includes one or more devices capable of receiving, generating, storing, processing, and/or providing information, such as information described herein. For example, UE 102 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RAN 201 may support, for example, a cellular radio access technology (RAT). RAN 201 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 102. RAN 201 may transfer traffic between UE 102 (e.g., using a cellular RAT), one or more base stations (e.g., using a wireless interface or a backhaul interface, such as a wired backhaul interface), and/or core network 202. RAN 201 may provide one or more cells that cover geographic areas.

In some implementations, RAN 201 may perform scheduling and/or resource management for UE 102 covered by RAN 201 (e.g., UE 102 covered by a cell provided by RAN 201). In some implementations, RAN 201 may be controlled or coordinated by a network controller, which may perform load balancing, network-level configuration, and/or other operations. The network controller may communicate with RAN 201 via a wireless or wireline backhaul. In some implementations, RAN 201 may include a network controller, a self-organizing network (SON) module or component, or a similar module or component. In other words, RAN 201 may perform network control, scheduling, and/or network management functions (e.g., for uplink, downlink, and/or sidelink communications of UE 102 covered by RAN 201).

In some implementations, core network 202 may include an example functional architecture in which systems and/or methods described herein may be implemented. For example, core network 202 may include an example architecture of a 5G next generation (NG) core network included in a 5G wireless telecommunications system. While the example architecture of core network 202 shown in FIG. 2B may be an example of a service-based architecture, in some implementations, core network 202 may be implemented as a reference-point architecture and/or a 4G core network, among other examples.

As shown in FIG. 2B, core network 202 may include a number of functional elements. The functional elements may include, for example, the AMF device 106, the PCF device 108, the UDM device 110, the UDR device 112, a network slice selection function (NSSF) 250, a network exposure function (NEF) 255, an authentication server function (AUSF) 260, an application function (AF) 265, a session management function (SMF) 270, and/or a user plane function (UPF) 275. These functional elements may be communicatively connected via a message bus 280. Each of the functional elements shown in FIG. 2B is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

AMF device 106 includes one or more devices that act as a termination point for NAS signaling and/or mobility management, among other examples.

PCF device 108 includes one or more devices that provide a policy framework that incorporates network slicing, roaming, packet processing, and/or mobility management, among other examples.

UDM device 110 includes one or more devices that store user data and profiles in the wireless telecommunications system. UDM device 110 may be used for fixed access and/or mobile access in core network 202. The user data and profiles may be stored in the UDR device 112, which includes a data repository for storing the user data and profiles.

NSSF 250 includes one or more devices that select network slice instances for UE 102. By providing network slicing, NSSF 250 allows an operator to deploy multiple substantially independent end-to-end networks potentially with the same infrastructure. In some implementations, each slice may be customized for different services.

NEF 255 includes one or more devices that support exposure of capabilities and/or events in the wireless telecommunications system to help other entities in the wireless telecommunications system discover network services.

AUSF 260 includes one or more devices that act as an authentication server and support the process of authenticating UE 102 in the wireless telecommunications system.

AF 265 includes one or more devices that support application influence on traffic routing, access to NEF 255, and/or policy control, among other examples.

SMF 270 includes one or more devices that support the establishment, modification, and release of communication sessions in the wireless telecommunications system. For example, SMF 270 may configure traffic steering policies at UPF 275 and/or may enforce user equipment IP address allocation and policies, among other examples.

UPF 275 includes one or more devices that serve as an anchor point for intra-RAT and/or inter-RAT mobility. UPF 275 may apply rules to packets, such as rules pertaining to packet routing, traffic reporting, and/or handling user plane QoS, among other examples.

Message bus 280 represents a communication structure for communication among the functional elements. In other words, message bus 280 may permit communication between two or more functional elements.

Data network 203 includes one or more wired and/or wireless data networks. For example, data network 203 may include an IMS, a PLMN, a LAN, a WAN, a MAN, a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2B are provided as an example. In practice, there may be additional devices and/or networks, fewer devices and/or networks, different devices and/or networks, or differently arranged devices and/or networks than those shown in FIG. 2B. Furthermore, two or more devices shown in FIG. 2B may be implemented within a single device, or a single device shown in FIG. 2B may be implemented as multiple, distributed devices. Additionally, or alternatively, a set of devices (e.g., one or more devices) of example environment 200B may perform one or more functions described as being performed by another set of devices of example environment 200B.

Figure 3:
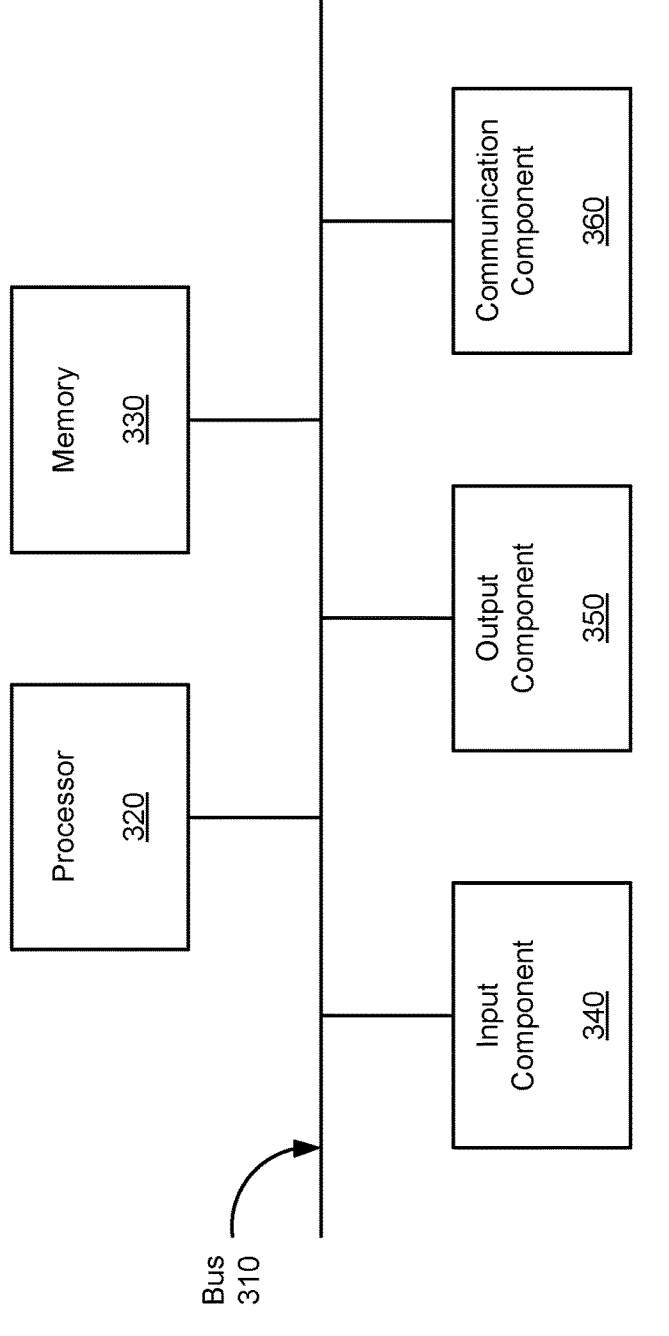
FIG. 3 is a diagram of example components of a device associated with enhanced AM data control.

FIG. 3 is a diagram of example components of a device 300 associated with enhanced AM data control. The device 300 may correspond to the UE 102, the gNB 104, the AMF device 106, the PCF device 108, the UDM device 110, the UDR device 112, the eNB 130, the MME device 132, base station 210, the SGW 220, the PGW 225, the PCRF 230, the HSS 235, the AAA 240, the NSSF 250, the NEF 255, the AUSF 260, the AF 265, the SMF 270, and/or the UPF 275.

In some implementations, the UE 102, the gNB 104, the AMF device 106, the PCF device 108, the UDM device 110, the UDR device 112, the eNB 130, the MME device 132, base station 210, the SGW 220, the PGW 225, the PCRF 230, the HSS 235, the AAA 240, the NSSF 250, the NEF 255, the AUSF 260, the AF 265, the SMF 270, and/or the UPF 275 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with enhanced AM data control. In some implementations, one or more process blocks of FIG. 4 may be performed by a PCF device (e.g., PCF device 108). In some implementations, one or more process blocks of FIG. 4 may be performed by another device or a group of devices separate from or including the PCF device, such as a UE (e.g., the UE 102), a gNB (e.g., the gNB 104), an AMF device (e.g., the AMF device 106), a UDM device (e.g., the UDM device 110), a UDR device (e.g., the UDR device 112), an eNB (e.g., the eNB 130), an MME device (e.g., the MME device 132), a base station (e.g., the base station 210), an SGW (e.g., the SGW 220), a PGW (e.g., the PGW 225), a PCRF (e.g., the PCRF 230), an HSS (e.g., the HSS 235), an AAA (e.g., the AAA 240), an NSSF (e.g., the NSSF 250), an NEF (e.g., the NEF 255), an AUSF (e.g., the AUSF 260), an AF (e.g., the AF 265), an SMF (e.g., the SMF 270), and/or a UPF (e.g., the UPF 275). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving, from an AMF device, an AM policy association request that is related to a UE (block 410). For example, the PCF device may receive, from an AMF device, an AM policy association request that is related to a UE, as described above. In some implementations, the UE is associated with AM policy data. As an example, the AM policy association request may be associated with at least one of a registration procedure or a handover procedure.

As further shown in FIG. 4, process 400 may include modifying at least a portion of the AM policy data to generate modified AM policy data associated with the UE (block 420). For example, the PCF device may modify at least a portion of the AM policy data to generate modified AM policy data associated with the UE, as described above. In some implementations, process 400 includes receiving, from a server device, an indication of changed AM policy data associated with the UE. The modified AM policy data may be based on the changed AM policy data. The AM policy data may be stored by at least one of a UDM device or a UDR device. In some implementations, the modified AM policy data may be generated via a script that modifies (e.g., overwrites) at least the portion of the AM policy data.

As an example, the modified AM policy data may be generated by the PCF device.

As further shown in FIG. 4, process 400 may include creating, based on the modified AM policy data, an AM control policy associated with the UE (block 430). For example, the PCF device may create, based on the modified AM policy data, an AM control policy associated with the UE, as described above.

As further shown in FIG. 4, process 400 may include transmitting, to the AMF device, an AM policy association message, responsive to the AM policy association request, indicating the AM control policy (block 440). For example, the PCF device may transmit, to the AMF device, an AM policy association message, responsive to the AM policy association request, indicating the AM control policy, as described above. In some implementations, the AM control policy is associated with an expiry period.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
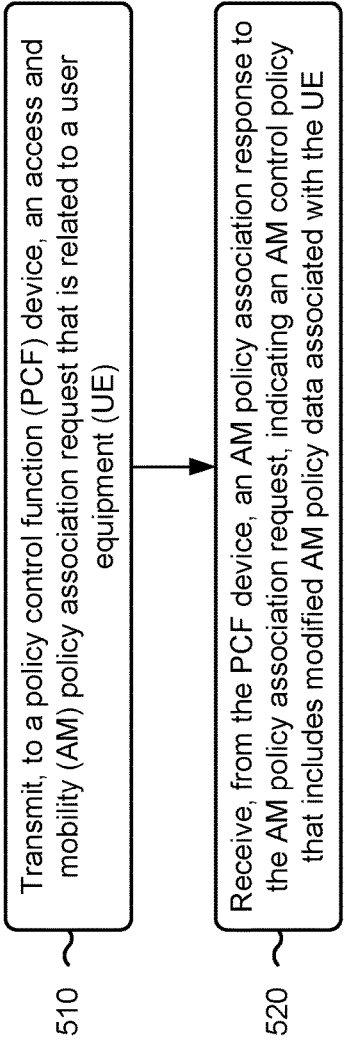

FIG. 5 is a flowchart of an example process 500 associated with enhanced AM data control. In some implementations, one or more process blocks of FIG. 5 may be performed by an AMF device (e.g., the AMF device 106). In some implementations, one or more process blocks of FIG. 5 may be performed by another device or a group of devices separate from or including the AMF device, such as a UE (e.g., the UE 102), a gNB (e.g., the gNB 104), a PCF device (e.g., the PCF device 108), a UDM device (e.g., the UDM device 110), a UDR device (e.g., the UDR device 112), an eNB (e.g., the eNB 130), an MME device (e.g., the MME device 132), a base station (e.g., the base station 210), an SGW (e.g., the SGW 220), a PGW (e.g., the PGW 225), a PCRF (e.g., the PCRF 230), an HSS (e.g., the HSS 235), an AAA e.g., the AAA 240), an NSSF (e.g., the NSSF 250), an NEF (e.g., the NEF 255), an AUSF (e.g., the AUSF 260), an AF (e.g., the AF 265), an SMF (e.g., the SMF 270), and/or a UPF (e.g., the UPF 275). Additionally, or alternatively, one or more process blocks of FIG. 5 may be performed by one or more components of device 300, such as processor 320, memory 330, input component 340, output component 350, and/or communication component 360.

As shown in FIG. 5, process 500 may include transmitting, to a PCF device, an AM policy association request that is related to a UE (block 510). For example, the AMF may transmit, to a PCF device, an AM policy association request that is related to a UE, as described above. In some implementations, the UE is associated with AM policy data. In some implementations, the AM policy association request is associated with a registration procedure and/or a handover procedure.

As further shown in FIG. 5, process 500 may include receiving, from the PCF device, an AM policy association response to the AM policy association request, indicating an AM control policy that includes modified AM policy data associated with the UE (block 520). For example, the AMF may receive, from the PCF device, an AM policy association response to the AM policy association request, indicating an AM control policy that includes modified AM policy data associated with the UE, as described above. In some implementations, the modified AM policy data is generated by the PCF device. In some implementations, the AM policy data is stored by a UDM device and/or a UDR device. In some implementations, process 500 includes deriving, based on the modified AM policy data, data associated with the UE and/or data associated with the UE. In some implementations, the AM control policy is associated with an expiry period. In some implementations, the modified AM policy data is generated by the PCF device and overwrites at least a portion of the AM policy data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a policy control function (PCF) device and from an access and mobility management function (AMF) device, an access and mobility (AM) policy association request that is related to a user equipment (UE),
      wherein the policy association request comprises a last visited registered tracking area identity of the UE, and
      wherein the UE is associated with AM policy data;
   modifying, by the PCF device, at least a portion of the AM policy data to generate modified AM policy data associated with the UE;
   creating, by the PCF device and based on the modified AM policy data, an AM control policy associated with the UE;
   transmitting, by the PCF device and to the AMF device, an AM policy association message, responsive to the AM policy association request, indicating the AM control policy; and
   updating the AM control policy after an expiry period associated with the AM control policy, wherein the updated AM control policy replaces the modified AM policy data with the AM policy data.

2. The method of claim 1, further comprising:
   receiving, from a network device, an indication of changed AM policy data associated with the UE,
      wherein the modified AM policy data is based on the changed AM policy data.

3. The method of claim 1,
   wherein the AM control policy is associated with an expiry period.

4. The method of claim 1,
   wherein the AM policy association request is associated with at least one of:
      a registration procedure, or
      a handover procedure.

5. The method of claim 1,
   wherein the AM policy data is stored by at least one of:
      a unified data management (UDM) device, or
      a unified data repository (UDR) device.

6. The method of claim 1,
   wherein the modified AM policy data is generated to modify at least the portion of the AM policy data.

7. The method of claim 1,
   wherein the modified AM policy data is generated by the PCF device and overwrites at least a portion of the AM policy data.

8. A network device, comprising:

one or more processors configured to:

transmit, to a policy control function (PCF) device, an access and mobility (AM) policy association request that is related to a user equipment (UE), wherein the policy association request comprises a last visited registered tracking area identity of the UE, and wherein the UE is associated with AM policy data; and receive, from the PCF device, an AM policy association response to the AM policy association request, indicating an AM control policy that includes modified AM policy data associated with the UE, wherein the modified AM policy data is generated by the PCF device, and wherein the AM control policy is updated after an expiry period associated with the AM control policy, and wherein the updated AM control policy replaces the modified AM policy data with the AM policy data.

9. The network device of claim 8, wherein the one or more processors are further configured to:

derive, based on the modified AM policy data, at least one of:

registration data associated with the UE, or context data associated with the UE.

10. The network device of claim 8, wherein the AM policy data is stored by at least one of:

a unified data management (UDM) device, or a unified data repository (UDR) device.

11. The network device of claim 8, wherein the AM policy association request is associated with at least one of:

a registration procedure, or a handover procedure.

12. The network device of claim 8, wherein the AM control policy is associated with an expiry period.

13. The network device of claim 8, wherein the modified AM policy data is generated by the PCF device and overwrites at least a portion of the AM policy data.

14. A non-transitory computer-readable medium storing a set of instructions, the set of instructions comprising:

one or more instructions that, when executed by one or more processors of a policy control function (PCF) device, cause the PCF device to:

receive, from an access and mobility management function (AMF) device, an access and mobility (AM) policy association request that is related to a user equipment (UE), wherein the policy association request comprises a last visited registered tracking area identity of the UE, and wherein the UE is associated with AM policy data;

modify at least a portion of the AM policy data to generate modified AM policy data associated with the UE;

create, based on the modified AM policy data, an AM control policy associated with the UE;

transmit, to the AMF device, an AM policy association message, responsive to the AM policy association request, indicating the AM control policy; and update the AM control policy after an expiry period associated with the AM control policy, wherein the updated AM control policy replaces the modified AM policy data with the AM policy data.

15. The non-transitory computer-readable medium of claim 14, wherein the one or more instructions that, when executed by the one or more processors, further cause the PCF device to:

receive, from a network device, an indication of changed AM policy data associated with the UE, wherein the modified AM policy data is based on the changed AM policy data.

16. The non-transitory computer-readable medium of claim 14, wherein the AM control policy is associated with an expiry period.

17. The non-transitory computer-readable medium of claim 14, wherein the AM policy association request is associated with at least one of:

a registration procedure, or a handover procedure.

18. The non-transitory computer-readable medium of claim 14, wherein the AM policy data is received from at least one of:

a unified data management (UDM) device, or a unified data repository (UDR) device.

19. The non-transitory computer-readable medium of claim 14, wherein the AM policy data is generated via a script that modifies at least the portion of the AM policy data.

20. The non-transitory computer-readable medium of claim 14, wherein the modified AM policy data is generated by the PCF device and overwrites at least a portion of the AM policy data.

\* \* \* \* \*